US011756394B2

(12) United States Patent
Berglund et al.

(10) Patent No.: US 11,756,394 B2
(45) Date of Patent: *Sep. 12, 2023

(54) WIRELESS TRACKING SYSTEM FOR MERCHANDISE SECURITY

(71) Applicant: InVue Security Products Inc., Charlotte, NC (US)

(72) Inventors: David N. Berglund, Indian Trail, NC (US); Christopher J. Fawcett, Charlotte, NC (US); Gary A. Taylor, Fort Mill, SC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/825,102

(22) Filed: May 26, 2022

(65) Prior Publication Data
US 2022/0292940 A1    Sep. 15, 2022

Related U.S. Application Data

(63) Continuation of application No. 16/713,768, filed on Dec. 13, 2019, now Pat. No. 11,348,421.

(60) Provisional application No. 62/779,830, filed on Dec. 14, 2018.

(51) Int. Cl.
| G08B 13/14 | (2006.01) |
| G08B 13/24 | (2006.01) |
| H04W 4/80 | (2018.01) |
| H04W 4/021 | (2018.01) |
| H04W 4/02 | (2018.01) |

(52) U.S. Cl.
CPC ..... *G08B 13/1427* (2013.01); *G08B 13/2462* (2013.01); *G08B 13/2485* (2013.01); *H04W 4/021* (2013.01); *H04W 4/023* (2013.01); *H04W 4/80* (2018.02)

(58) Field of Classification Search
None
See application file for complete search history.

(56) References Cited

U.S. PATENT DOCUMENTS

| 10,062,250 | B2 | 8/2018 | Grant et al. | |
| 2011/0068906 | A1* | 3/2011 | Shafer | G06K 7/10475 340/10.3 |
| 2017/0173262 | A1* | 6/2017 | Veltz | G16H 20/17 |
| 2017/0178477 | A1* | 6/2017 | Turgeon | G08B 13/2417 |
| 2017/0255898 | A1* | 9/2017 | Thomas | G08B 13/2462 |
| 2019/0221083 | A1 | 7/2019 | Grant et al. | |
| 2020/0193785 | A1 | 6/2020 | Berglund et al. | |

FOREIGN PATENT DOCUMENTS

WO    2016179250 A2    11/2016

* cited by examiner

*Primary Examiner* — Thomas S McCormack
(74) *Attorney, Agent, or Firm* — InVue Security Products Inc.

(57) ABSTRACT

Embodiments of the present invention are directed to merchandise security systems and methods for displaying and protecting items of merchandise from theft. A merchandise security system and method according to the invention includes at least one tag and a plurality of nodes positioned within a display area. The plurality of nodes are operable for determining a location of the tag. The wireless beacon tracking system further includes a server operably associated with the plurality of nodes for receiving information related to the location of the tag.

19 Claims, 7 Drawing Sheets

WIRELESS TRACKING SYSTEM FOR MERCHANDISE SECURITY

CROSS REFERENCE TO RELATED APPLICATIONS

This application is a continuation of and claims priority to U.S. application Ser. No. 16/713,768, filed on Dec. 13, 2019, which is a non-provisional of and claims priority to U.S. Provisional Application No. 62/779,830, filed on a Dec. 14, 2018, the content of which is incorporated by reference herein in its entirety.

FIELD OF THE INVENTION

Embodiments of the present invention relate generally to security devices, systems, and methods for protecting the item of merchandise from theft.

BACKGROUND OF THE INVENTION

It is common practice for retailers to use merchandise security devices to protect items of merchandise from theft. The value of the item, however, may make it an attractive target for a shoplifter despite the presence of a merchandise security device. A determined shoplifter may attempt to detach the item or packaging from the merchandise security device, or attempt to remove the item along with the security device from the store.

BRIEF SUMMARY

Embodiments of the present invention are directed to a merchandise security system. The merchandise security system includes a plurality of tags, where one or more of the tags associated with at least one item of merchandise are located within a display area of a retail store. The merchandise security system also includes a plurality of nodes in a crowdsourced network configured to wirelessly communicate with at least one of the plurality of tags for determining a location of an item of merchandise, and a server in communication with the plurality of nodes for tracking the location of the item of merchandise.

According to another embodiment, a method for protecting an item of merchandise from theft is provided. The method includes positioning a plurality of tags within a display area of a retail store, where each of the tags is associated with a respective item of merchandise. The method further includes using a plurality of nodes in a crowdsourced network to wirelessly communicate with at least one of the tags for determining a location of the item of merchandise, and using a server in communication with the plurality of nodes to determine a location of the item of merchandise.

DETAILED DESCRIPTION OF EMBODIMENTS OF THE INVENTION

Figure 1:
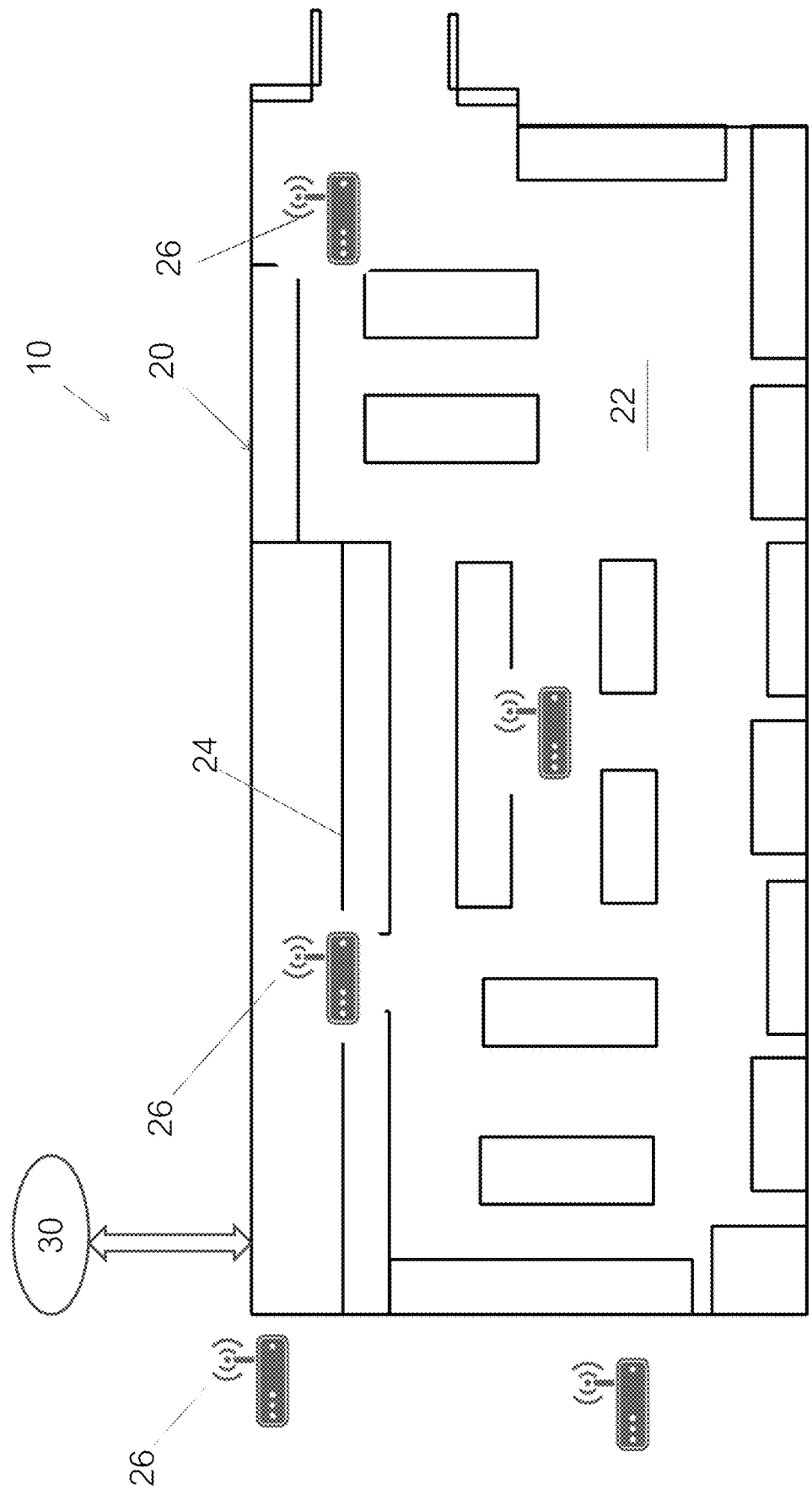
FIG. 1 is schematic of a merchandise security system according to one embodiment of the present invention.

Referring now to the accompanying drawing figures wherein like reference numerals denote like elements throughout the various views, one or more embodiments of a merchandise security system 10 and method for displaying items of merchandise and protecting the items of merchandise from theft are shown. Embodiments of the present invention include a merchandise security system 10 and method that utilize wireless tracking to determine the location of one or more items of merchandise. A merchandise security system 10 and method according to embodiments of the invention are operable for use with items of merchandise 12 and security devices using a crowdsourced or blockchain network. In some embodiments, items of merchandise 12 are portable computing devices, e.g., mobile telephones (e.g., Smartphone), personal computers (e.g., tablet, laptop, etc.), wearable wireless devices and digital cameras, while in other embodiments, the item of merchandise may be a packaged item of merchandise or the like wherein such items do not have any location-tracking capabilities, such as GPS or cellular hardware. The merchandise security system 10 may also be suitable for use with a variety of types of security devices, such as sensors, hard tags, cable wraps, and safers. In some embodiments shown and described herein, the merchandise security system 10 is provided for tracking and protecting an item of merchandise from theft. In one embodiment, the merchandise security system 10 utilizes a wireless tracking system 20 to track the position of the items of merchandise 12, as will be explained in further detail below.

Figure 2:
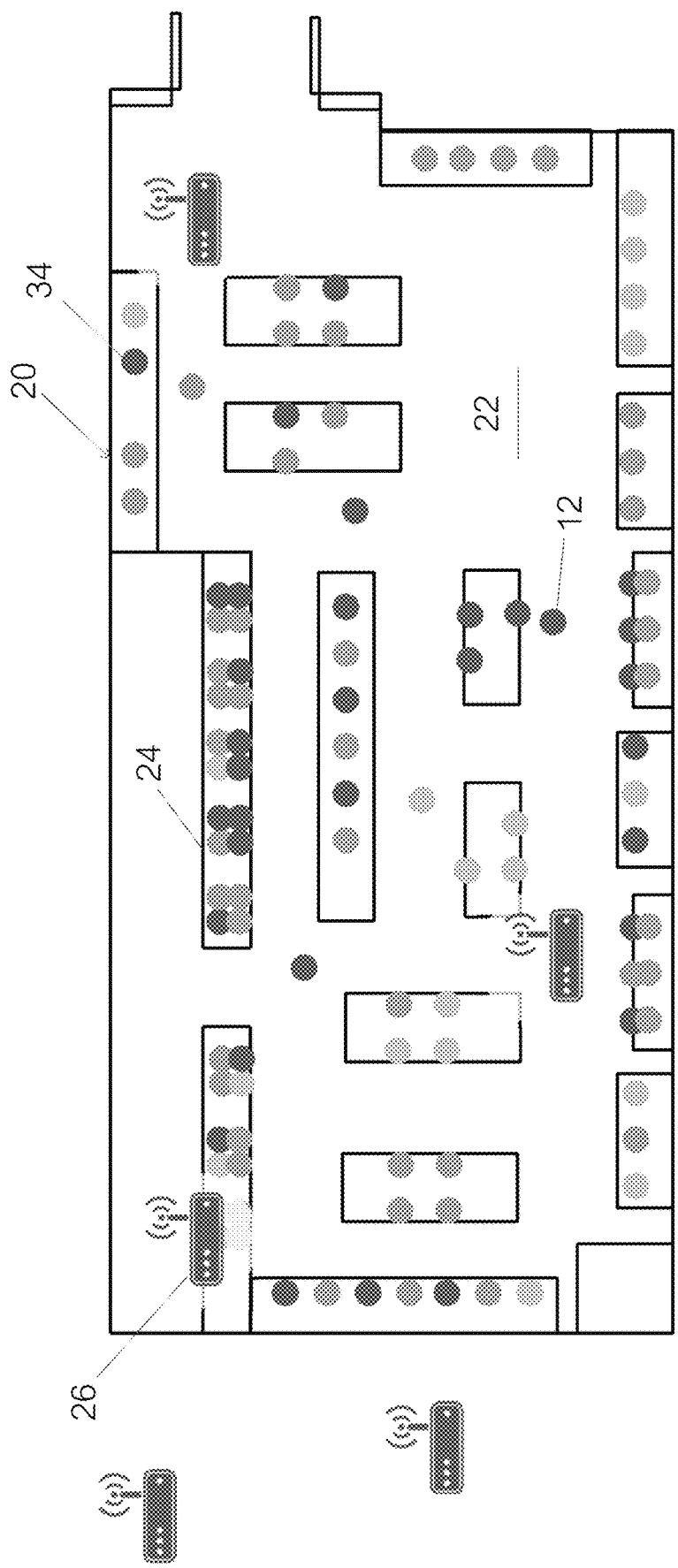
FIG. 2 is a schematic illustrating a plurality of nodes, tags, and items of merchandise within a retail store of the merchandise security system of FIG. 1.
Figure 3:
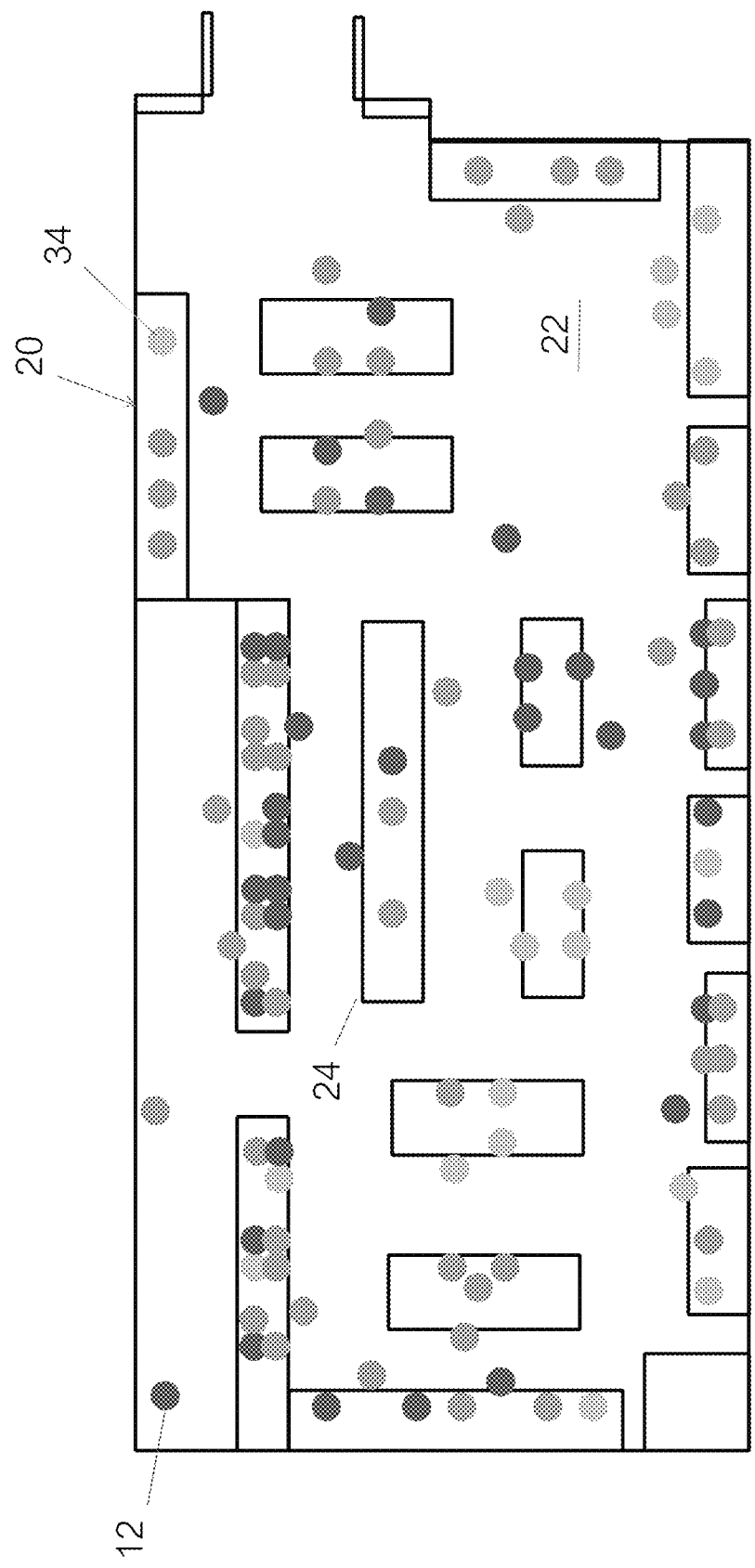
FIG. 3 is a schematic illustrating a plurality of items of merchandise and/or tags that have moved within the retail store of the merchandise security system of FIG. 1.
Figure 4:
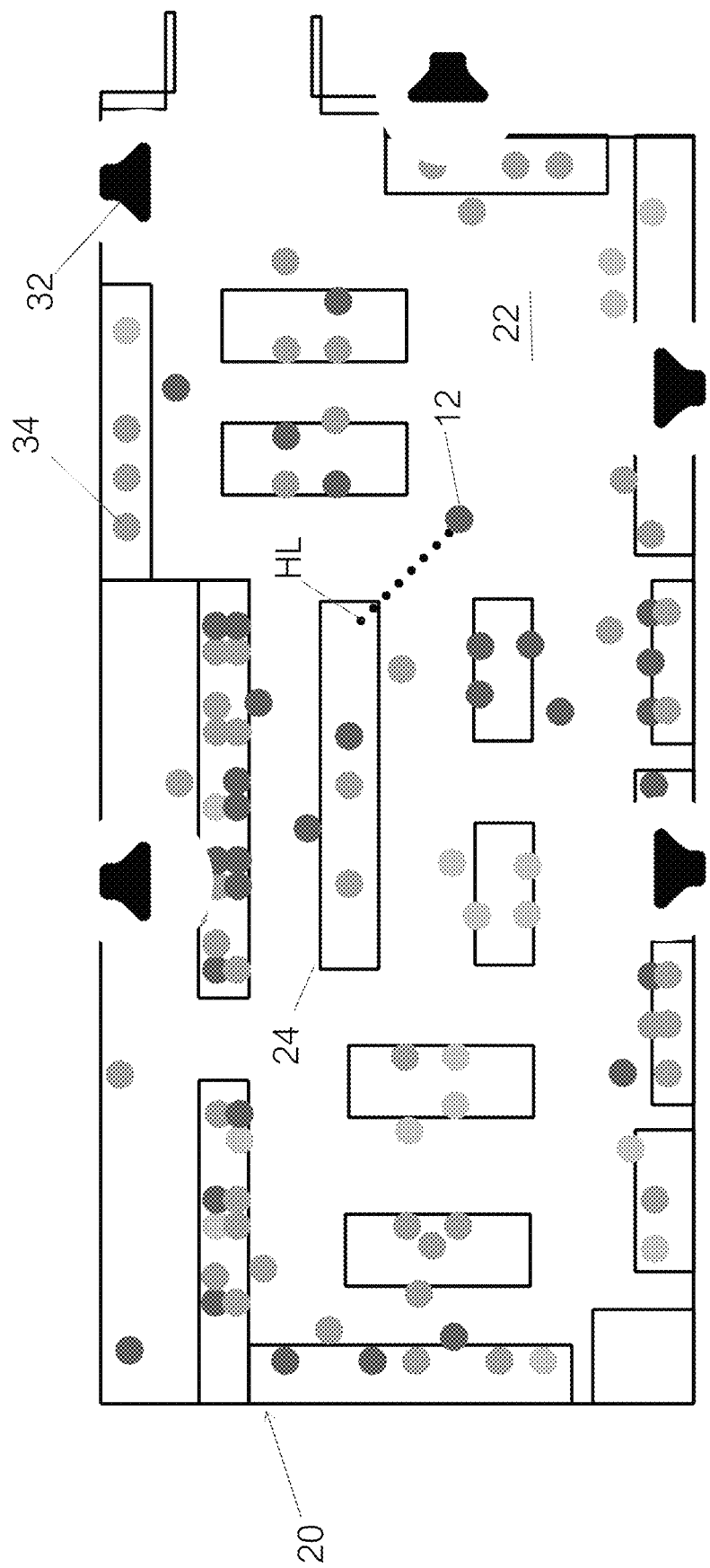
FIG. 4 is a schematic illustrating a plurality of annunciators located within the retail store of the merchandise security system of FIG. 1.

FIG. 2 illustrates a wireless beacon tracking system 20 according to an embodiment of the present invention provided in an open display area 22, such as a merchandise display area of a retail store, for displaying and protecting items of merchandise 12. As used herein, the term "open" is intended to mean that a customer may move about within the display area 22 without passing through a security checkpoint or gateway (e.g., EAS gate 40) that detects a security signal transmitted or emitted by a tag 34 attached to the item of merchandise 12. In some cases, the display area 22 is the entire retail store. The wireless beacon tracking system 20 may include a custom floor plan in a retail environment. The display area 22 may include a number of display surfaces 24, such as a table, shelf, countertop, cabinet, drawer, or the like, for supporting one or more items of merchandise 12. Typically, several items of merchandise 12 of the same type or different types are supported on each display surface 24. The items of merchandise 12 may be supported on a display surface 24 without the device being attached or tethered to a merchandise security device. As a result, a customer may examine and freely interact with the item of merchandise 12 in a manner that enhances the customer experience, and thereby increases the likelihood that the customer will make a decision to purchase the device. Typically, the customer purchases the item of merchandise 12 from the inventory of the retailer with the assistance of a sales associate. Notwithstanding the foregoing, it is understood that each of the items of merchandise 12 may be tethered to the display surface 24 or security device in other embodiments.

The wireless beacon tracking system 20 comprises a plurality of nodes 26. By way of example and not limitation, a plurality of nodes 26 may be located within the display area 22 and/or outside the display area 22, as illustrated in FIG. 2. Regardless, each node 26 is operable for communicating with the tags 34 and in some cases, detecting one or more tags associated with respective items of merchandise 12 and periodically tracking the location of the tags detected by the nodes. The wireless beacon tracking system 20 further comprises a server 30 operable for communicating with each of the nodes 26 to determine the location of a tag 34 relative to the nodes. In some cases, the server 30 may be a cloud-based server on a public or private network for receiving and analyzing various information received from the nodes 26 and/or tags 34. In some embodiments, the nodes 26 may be associated with a network of portable electronic devices of customers or of the public (e.g., cellular phones). Thus, the wireless beacon tracking system 20 may be used in a crowdsourced environment for tracking tags 34 within or outside of the display area 24 as explained in further detail below. In some embodiments, the nodes 26 may correspond to one or more beacons distributed throughout the display area 22. In other examples, nodes 26 may be items of merchandise 12 in the display area 22.

Figure 7:
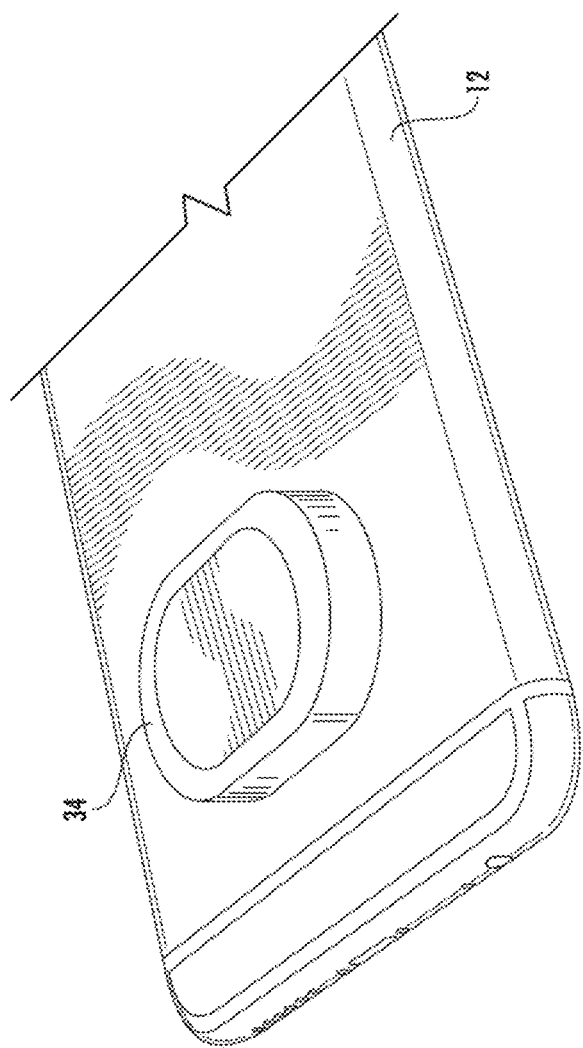
FIG. 7 is a perspective view of an item of merchandise and a tag attached thereto according to one embodiment of the present invention.

In one embodiment, the merchandise security system 10 further includes a plurality of tags 34. Each tag 34 may be, for example, any device configured for communication with nodes 26 in the display area 22. In one embodiment, FIG. 7 shows that a tag 34 is attached to a respective item of merchandise 12, although more than one tag can be attached to an item of merchandise, if desired. The tags 34 may be coupled to an item of merchandise 12 or its packaging using any suitable technique, such as with an adhesive, cables, and the like, or may be placed within the packaging with the item of merchandise. In some cases, the tag 34 may be removable and reusable, while in others the tag may be disposable. In addition, a tag 34 may include a variety of components. For example, the tags 34 may include a communication system for communicating with one another, the nodes 26, and/or the items of merchandise 12. For instance, the communication system may be configured for wireless communication using any desired communications protocol, such as Bluetooth communication, Bluetooth low energy communication, WiFi, cellular, received signal strength indicator ("RSSI"), ultra-wideband (UWB) and/or ambient backscatter. The communication system may include an antenna for carrying out such communication. In some embodiments, the tags 34 may be configured to communicate with one another via respective communication systems. For example, the tags 32 may communicate with one another to transmit or relay signals to nodes 26. Thus, the tags 34 may be configured to communicate with one another and other components within the system 10. In some cases, the communication between the tags 34 and nodes 26 may be one way, although two-way communication may be employed in other embodiments. In one example, the tag 34 is an RFID tag. In other embodiments, the tags 34 are similar to Tile® tags (Tile Inc.) and TrackR® (TrackR Inc.) or Adero tags whereby the items of merchandise 12 and/or nodes 26 may be provided with a compatible software application to cooperate with such tags.

It is understood that the tag 34 may have any desired size and configuration suitable for attachment to an item of merchandise 12 or its packaging. For example, the tag 34 may include a housing with a low profile that does not take away from the presentation of the item of merchandise 12. In some embodiments, the tags 34 are reusable such that the tags may be removed by a sales associate or at a checkout counter and reused on another item of merchandise 12. In the case where the tag 34 includes a battery, the battery may be rechargeable. In some embodiments, the tag 34 may be configured to be integrated with an item of merchandise 12 or a security device. For example, the tag 34 may be disposed within or otherwise housed by the security device. In other embodiments, the tag 34 may include a sensing device, such as a pressure or plunger switch, that is configured to detect the item of merchandise 12. In this regard, the sensing device may be configured to detect unauthorized removal of the tag 34 in response to actuation of the sensing device, which could in turn affect the communications system of the tag (e.g., initiating transmission of a signal from the tag).

FIG. 1 illustrates an embodiment of a merchandise security system 10 that utilizes a wireless beacon tracking system 20 according to the present invention. FIG. 2 shows a plurality of items of merchandise 12 located within a retail store. At least some of the items of merchandise 12 may secured by a merchandise security device, while other nodes 26 may be associated with customers within or outside of the retail store.

In one embodiment, each of the items of merchandise 12 to be displayed and protected by the wireless beacon tracking system 20 comprises a tag 34. Each tag 34 may be configured to transmit a signal that is detectable by at least one of the nodes 26. In one embodiment, each of the tags 34 may be registered with a server 30, such as a cloud-based server on a public or private network. For example, for each item of merchandise 12 on display in the display area, an identifier of an item of merchandise 12 and/or a tag 34 will be known and can be registered at a central location with the server 30. In one embodiment, the server 30 may be a central control device on a local area network. The server 30 may, for example, be a personal computer, such as a desktop, laptop, tablet or notebook computer, a mobile telephone, such as a Smartphone, or a wearable wireless device. In some embodiments, the server 30 may communicate with one or more remote devices 28. Each remote device 28 may be located at any desired location, such as remote from the wireless beacon tracking system 20 where an authorized user or administrator can manage and track the tags 34. In some cases, the user may log into an administrative online dashboard and define various levels of the location of the tags 34, upload floor plans or a map for each level, and/or mark the placement of each tag on the floor plan or map of each level. In other cases, remote devices 28 may be provided to sales associates located within or near the display area 22 for receiving various notifications and information from the server 30 and/or other remote devices. In one embodiment, the server 30 may include software that enables an authorized user to visually track the location of the tags 34, such as on a map.

In another embodiment, each of the items of merchandise 12 and/or tags 34 may be registered with a server 30. For example, for each device 12 on display in the display area can be associated with a specific tag 34 and can be registered at a central location with the server 30. In some embodiments, the server 30 may communicate with one or more nodes 26. Each node 26 may be located at any desired location within the wireless beacon tracking system 20 where an authorized user or administrator can manage and track the items of merchandise 12 and/or tags 34. In one embodiment, the server 30 may include software that enables an authorized user to visually track the location of the items of merchandise 12 and/or tags 34, such as on a map, in real time.

The nodes 26 of the wireless beacon tracking system 20 are operable for providing or obtaining the location of each of the tags 34 associated with items of merchandise 12. The nodes 26 may periodically obtain the location of the tags 34 to determine the locations of the items of merchandise 12, and upload the locations to the server 30 and/or the remote device 28. In the event that an item of merchandise 12 has moved from a home display location ("HL") or left the display area 22, the nodes 26 may be used to determine the location of the tag 34. For example, a tag 34 may only communicate with nodes 26 once the tag has left the display area 22, such as a retail store. The server 30, the nodes 26, and/or the remote device 28 may also provide a suitable output to an administrator of the merchandise security system 10, for example a sales associate assigned to the display area 22, if the item of merchandise 12 leaves the display area 22.

In another embodiment, the nodes 26 of the wireless beacon tracking system 20 are operable for obtaining information regarding each of the tags 34. In one embodiment, each tag 34 may be configured to transmit a "ping" or pulse signal that is detectable by one or more of the nodes 26, such as when a tag leaves a retail store or passes through an EAS tower at an exit of the store. The tag 34 may be configured to transmit a ping signal in predetermined increments of time (e.g., once about every one second). In some cases, Bluetooth communication may be employed. The server 30 may be configured to receive data from the nodes 26 which is used to determine a location of the tag 34, such as using GPS, time of flight, time distance on arrival, and/or triangulation techniques. Data from one or more nodes 26 (e.g., signal strength, the time the signal is received, etc.) may be used to calculate the location of the tag 34.

In one embodiment, the tags 34 may be configured to be removed by an authorized person without initiating an alarm signal. For instance, tags 34 may be allowed to be removed in one or more "safe zones", which may be designated locations where a sales associate may remove a tag. Because the location of the tags 34 may be tracked, the location of the tag relative to the safe zone when removed from the item of merchandise 12 may be indicative of whether an authorized removal occurred. If the tag 34 is removed within a safe zone, it can be safely assumed that the tag was removed by an authorized sales associate. If, however, the tag 34 is removed outside of a safe zone, then an alarm signal may be initiated. In some cases, the tag 34 may be configured to communicate with a key for removing the tags, such as via the exchange of a security code. In other cases, the sales associate may use a key to communicate with an authorized device while the tag 34 is in close proximity to the authorized device to signify that the tag is being removed by an authorized sales associate. The authorized device could be located within a safe zone.

Figure 5:
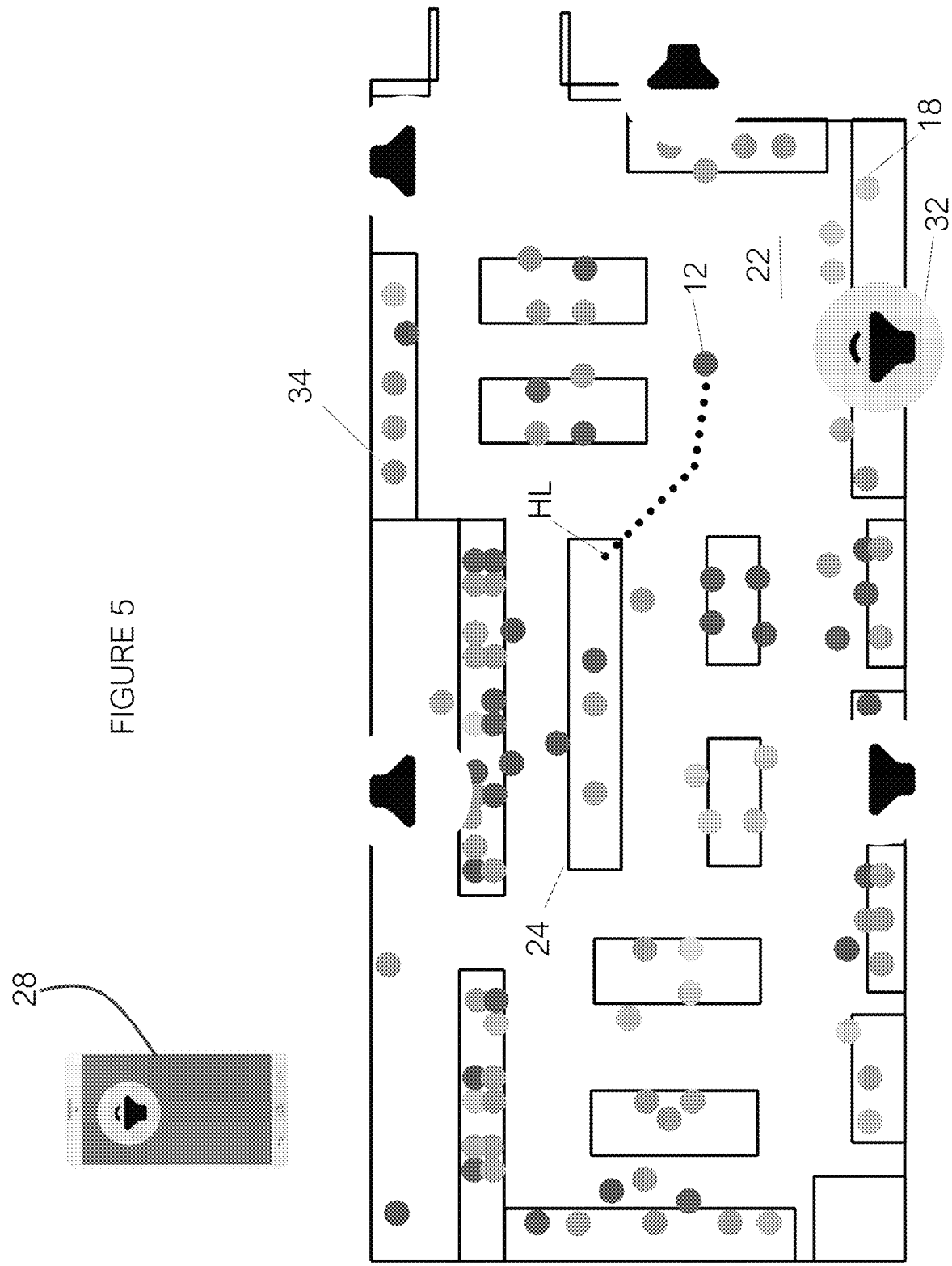
FIG. 5 is schematic illustrating an annunciator of FIG. 4 providing a notification based on a location of an item of merchandise.

In another embodiment, the merchandise security system 10 may transmit a message to the item of merchandise 12 to warn a customer that the device has been removed from the display area 22. By way of example and not limitation, the server 30 and/or remote device 28 may transmit a visual and/or audible alarm signal to the item of merchandise 12, or to another component of the system, when the device 12 is removed from the display area 22. If desired, a series of messages, signals, and/or alarms may be transmitted or initiated by the server 30 and/or any remote device 28 as the device 12 is removed from the display area 22. For example, the server 30 and/or remote device 28 may transmit or initiate an audio warning message instructing the customer to return the item of merchandise 12 to the display area 22. In the event the customer does not comply with the warning instruction, the server 30 and/or remote device 28 may transmit or initiate a visual and/or audible alarm signal. In addition, where a sales associate, security officer, or other store personnel is provided with one or more remote devices 28 (e.g., a mobile telephone or other communications device), the remote device may be notified, for example, by receiving a text message. Moreover, FIG. 5 shows that one or more annunciators 32 may be located at various desired locations about the display area 22 (e.g., at one or more exit points within the display area). One or more of the annunciators 32 may be in communication with the server 30 and/or remote devices 28 to provide an audio and/or a visual notification based on a location of the item of merchandise 12.

As mentioned above, the wireless tracking system 20 may utilize crowdsourcing networks to locate tags 34. The wireless tracking system 20 may utilize a number of items of merchandise 12, nodes 26, and/or tags 34 that communicate in a wireless network for transmitting and receiving various information, such as for obtaining or tracking a location of any device in the crowdsourced network. Such a crowdsourced network may require a common software application residing on each of the devices and a communication protocol to enable communication therebetween (e.g., BLE).

Figure 6:
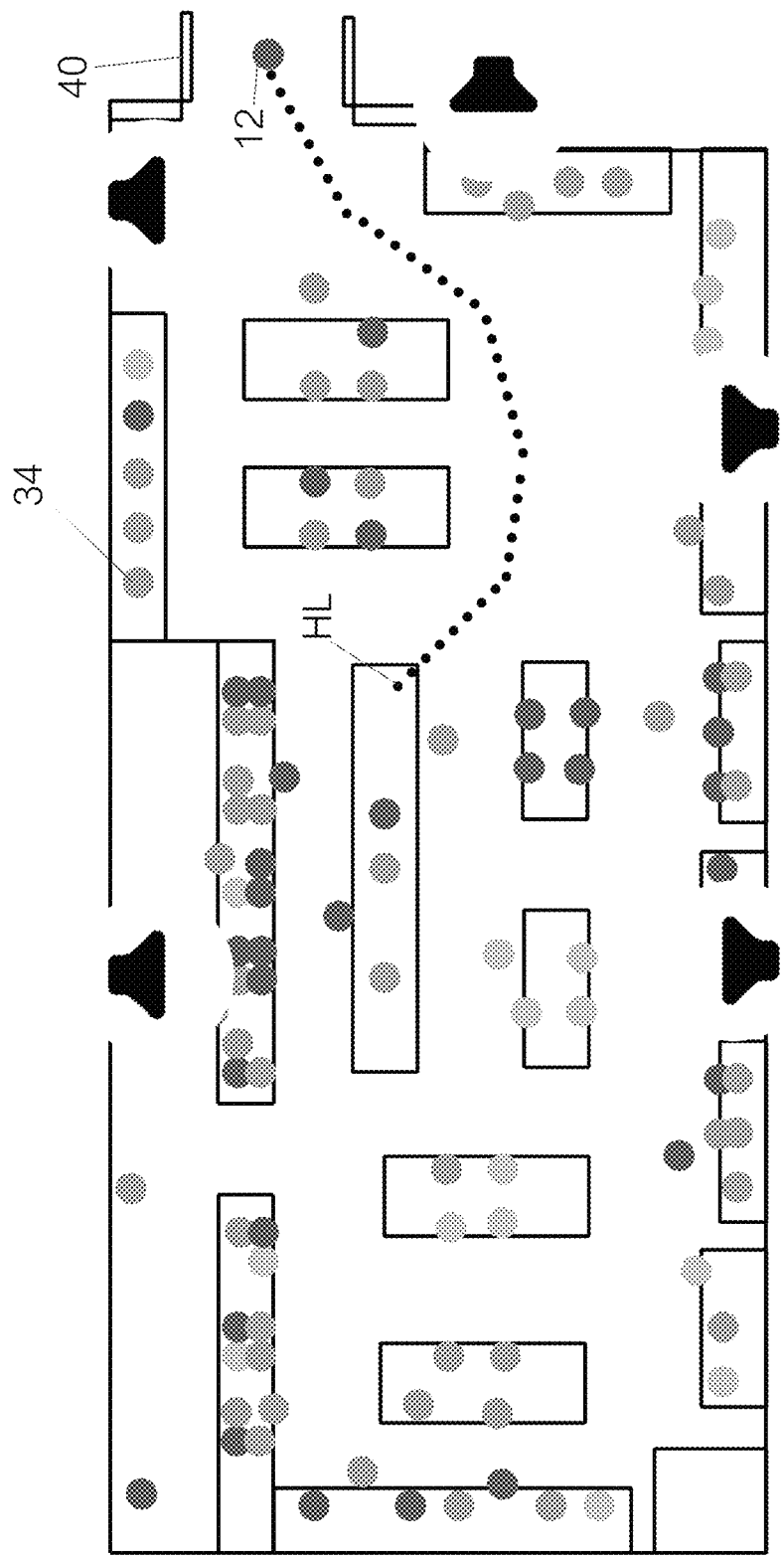
FIG. 6 is schematic illustrating an item of merchandise passing through an EAS gate 40 or tower within the retail store of the merchandise security system of FIG. 1.

In one particular example, the wireless tracking system 20 utilizes a BLE tracker community to track stolen goods once they are outside a retail store. A BLE tracker tag 34 according to this example includes an EAS device (e.g., an RF coil), communications circuitry (e.g., BLE), a controller (e.g., IC chip), a PCB, and a power source (e.g., a battery). In order to keep the battery as small as possible, the tag 34 may only be provided power when the tag leaves the retail store or display area 22 without permission. Another technique to conserve energy is to track the location of the tag 34 only during a predetermined time period (e.g., 48 hours or less) whereby the tag 34 only communicates with the nodes 26 within this predetermined time period. The tag 34 could detect when it passes through an EAS gate 40 or tower or otherwise exits a display area 22 or retail store (see, e.g., FIG. 6), which would then initiate communication with the nodes 26. Tags 34 could be brought into the retail store through a back room or non-EAS entry so as to not initiate communication until needed. At some point, whether at manufacture or entry into the store, the tag 34 serial number could be logged into a database, e.g., in a BLE community software application as a 'lost tag'. When a tag 34 leaves a retail store with EAS gates, the tag could be activated for transmitting a tracking ping using its communications circuitry. Any node 26 in the BLE community that receives the tag ping would report its location to the server 30 or other remote device 28.

In this embodiment, sell through tags 34 on purchased items of merchandise 12 need to be disabled before exiting the building so the BLE community does not identify validly purchased products as stolen. This could be accomplished through hardware, firmware, and/or software. For example, as with current EAS tags, the check-out counter installed electro-magnetic field generator may be used to overpower a fuse in the PCB circuit to disable the tag 34. Another technique is that the coil of the tag 34 senses a distinct electro-magnetic field generated at the check-out counter and locks the controller from broadcasting a tracking ping. In another example, tags 34 on purchased items of merchandise 12 are passively read at the point of sale, and the serial number of that tag is removed from the BLE community's 'lost tag' database. All tags 34, purchased or not, passing through EAS towers begin their ping sequence, but the BLE community application would ignore the tags on products that had been purchased and taken off the 'lost tag' list.

Another embodiment of the crowdsourcing technology could be used in display items of merchandise 12 within a retail store as another way to track a stolen item of merchandise on display. The stolen item of merchandise 12 could transmit a ping BLE signal that would be received by the BLE tracker community. Additionally, a stolen display item of merchandise 12 could be a node 26 for the BLE tracker community and identify other active tags 34 that had been stolen with the item of merchandise and relay their location, thereby defining a larger scale, multi-product theft. Embodiments of the present invention may be suitable for use with additional tracking methodologies for items of merchandise, such as disclosed in U.S. Pat. No. 10,062,250, entitled Sensor Powered by Item of Merchandise For Retail Security, which is hereby incorporated by reference in its entirety.

In another embodiment, a wireless tracking system 20 may be used to enable in-store tracking of various devices utilizing public location services such as the Tile® network or the XYO network. In these embodiments, the wireless tracking system 20 would operate on the existing public location network available in the store due to customers having these location tracking applications on their phones. Devices to be tracked could be tags 34 (e.g., employee ID cards, RFID tags, etc.) attached to items of merchandise 12, keys, and/or security devices (e.g., cable wraps and safers).

Distributed location systems are becoming more advanced and widespread. For example, the Tile network allows users with a Tile® device and associated software application to track the devices from other user's wireless devices like cell phones. If one were to leave a purse at a restaurant with a Tile® device in it, another user on the Tile® network could pick up the signal and deliver that information to the owner of the purse. This is all done without the user in the restaurant knowing that this occurred. Likewise, The XYO network is a distributed network that functions off blockchain technology to create truly trustless location data without the use of an intermediary to verify the location. The XYO network can track and deliver information on the location of XYO tags securely and accurately.

These types of technologies lead to a situation where a retail store may have a location tracking network in their store—namely, the customers whose cellular phones are logged into this network and looking for tags 34 could operate as nodes 26. This allows for a number of technologies for a retailer to employ to locate and track tags and/or items of merchandise on display without the major cost of installing a wireless monitoring system throughout their building.

For example, a retailer could use RFID tags 34 attached to the item of merchandise 12 and then use the existing network to track the movement of those tags around the store. The RFID tags 34 could be embedded in various well-known security devices such as cable wraps that enclose the product with cables, safers that enclose products in clear boxes, or tags that are clipped onto clothing and soft goods. By tracking these devices, various alerts could be generated. For example, when a significant number of tags 34 start moving from one location, it may be an indication that an Organized Retail Crime (ORC) event is happening. These tags 34 could also be helpful in understanding how much inventory is on the display shelves.

In another embodiment, the system 20 could track ID tags 34 of the employees. This could be useful in tracking floor information and rerouting employees to areas of need in the store.

In another embodiment, the system 20 could track security keys used to unlock various security devices in a retail store. Often the store does not have a key for every employee, so locating one can be the difficult task of wandering around looking for the person with the key. Also, a key could be tied to an employee ID, and the wireless tracking system 20 could determine if that person lost control of the key, such as if it was stolen or if the employee gave it to an unauthorized person. The system 20 could also find a key that had been misplaced in the store.

The foregoing has described one or more embodiments of a merchandise security system and method for displaying an item of merchandise and for protecting the item of merchandise from theft that utilize a wireless beacon tracking system. Embodiments of a merchandise security system and method have been shown and described herein for purposes of illustrating and enabling the best mode of the invention. Those of ordinary skill in the art, however, will readily understand and appreciate that numerous variations and modifications of the invention may be made without departing from the spirit and intended broad scope of the invention. Accordingly, all such variations and modifications are intended to be encompassed by the appended claims.

That which is claimed is:

1. A merchandise security system for protecting items of merchandise from theft, the merchandise security system comprising:
   a plurality of tags, one or more of the plurality of tags associated with at least one item of merchandise located within a display area of a retail store;
   a plurality of nodes in a crowdsourced network configured to wirelessly communicate with at least one of the plurality of tags for determining a location of an item of merchandise, wherein the plurality of nodes are items of merchandise; and
   a server in communication with the plurality of nodes for tracking the location of the item of merchandise.

2. The merchandise security system of claim 1, wherein the plurality of nodes are located within the retail store.

3. The merchandise security system of claim 1, wherein the plurality of nodes are located outside the retail store.

4. The merchandise security system of claim 1, wherein the plurality of nodes are located within and outside the retail store.

5. The merchandise security system of claim 1, wherein each of the plurality of tags is attached to or integrated with the item of merchandise.

6. The merchandise security system of claim 1, wherein each of the plurality of tags is attached to or integrated with a security device attached to the item of merchandise.

7. The merchandise security system of claim 1, wherein the plurality of nodes are cellular phones.

8. The merchandise security system of claim 1, wherein the plurality of tags and the plurality of nodes are configured to communicate using Bluetooth communication.

9. The merchandise security system of claim 1, wherein the plurality of nodes are configured to wirelessly communicate with the at least one of the plurality of tags in response to the tag leaving the display area.

10. The merchandise security system of claim 1, wherein the plurality of nodes are configured to communicate in a crowdsourced network based on blockchain technology.

11. The merchandise security system of claim 1, wherein each of the plurality of tags comprises a power source, and wherein each of the plurality of tags is configured to activate the power source in response to the tag exiting the display area or the retail store.

12. The merchandise security system of claim 1, wherein each of the plurality of tags is configured to communicate with the plurality of nodes in response to the tag exiting the display area or the retail store.

13. The merchandise security system of claim 1, wherein each of the plurality of tags is configured to communicate with the plurality of nodes only during a predetermined time period.

14. A method for protecting an item of merchandise from theft, the method comprising:
   positioning a plurality of tags within a display area of a retail store, each of the plurality of tags associated with a respective item of merchandise;
   using a plurality of nodes in a crowdsourced network to wirelessly communicate with at least one of the tags for determining a location of the item of merchandise, wherein the plurality of nodes are items of merchandise; and
   using a server in communication with the plurality of nodes to determine a location of the item of merchandise.

15. The method of claim 14, wherein using the plurality of nodes comprises using the plurality of nodes to wirelessly communicate with the at least one tag in response to the item of merchandise leaving the display area.

16. The method of claim 14, wherein using the plurality of nodes comprises using the plurality of nodes located within the retail store.

17. The method of claim 14, wherein using the plurality of nodes comprises using the plurality of nodes located outside the retail store.

18. The method of claim 14, wherein using the plurality of nodes comprises using the plurality of nodes to wirelessly communicate with the plurality of tags using Bluetooth communication.

19. The method of claim 14, wherein using the plurality of nodes comprises using the plurality of nodes in a crowdsourced network based on blockchain technology.

* * * * *